(12) United States Patent
Kumar et al.

(10) Patent No.: US 7,944,355 B2
(45) Date of Patent: May 17, 2011

(54) SECURITY TECHNIQUES IN THE RFID FRAMEWORK

(75) Inventors: Anush Kumar, Seattle, WA (US); Balasubramanian Sriram, Sammamish, WA (US); Mohamed Fakrudeen Ali Ahmed, Coimbatore (IN); Janaki Ram Goteti, Hyderabad (IN); Abhishek Agarwal, Hyderabad (IN); Ramachandran Venkatesh, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 939 days.

(21) Appl. No.: 11/141,533

(22) Filed: May 31, 2005

(65) Prior Publication Data

US 2006/0055508 A1 Mar. 16, 2006

Related U.S. Application Data

(60) Provisional application No. 60/606,281, filed on Sep. 1, 2004, provisional application No. 60/606,577, filed on Sep. 2, 2004.

(51) Int. Cl.
*G08B 13/14* (2006.01)
(52) U.S. Cl. ........ 340/572.1; 340/10.1; 726/2; 709/203; 235/375
(58) Field of Classification Search .......... 340/5.27, 340/5.61, 10.1, 10.5, 572.1–572.9; 726/2, 726/4, 9, 20, 27, 29; 709/203, 208–277; 235/375, 376
See application file for complete search history.

(56) References Cited

U.S. PATENT DOCUMENTS

| | | | |
|---|---|---|---|
| 4,975,865 A | 12/1990 | Carrette | |
| 5,119,470 A | 6/1992 | Highland | |
| 5,644,770 A | 7/1997 | Burke | |
| 5,650,768 A | 7/1997 | Eswaran | |
| 5,862,325 A | 1/1999 | Reed | |
| 5,910,776 A | 6/1999 | Black | |
| 5,949,335 A * | 9/1999 | Maynard | 340/572.1 |
| 6,088,717 A | 7/2000 | Reed | |
| 6,158,010 A * | 12/2000 | Moriconi et al. | 726/1 |
| 6,304,973 B1 * | 10/2001 | Williams | 726/3 |
| 6,405,261 B1 | 6/2002 | Gaucher | |
| 6,618,806 B1 * | 9/2003 | Brown et al. | 713/186 |
| 6,631,363 B1 | 10/2003 | Brown et al. | |
| 6,677,852 B1 | 1/2004 | Landt | |
| 6,732,923 B2 | 5/2004 | Otto | |
| 6,784,802 B1 | 8/2004 | Stanescu | |

(Continued)

FOREIGN PATENT DOCUMENTS

EP 11632893 3/2006

(Continued)

OTHER PUBLICATIONS

Bornhovd et al., Integrating Smart Items With Business Processes An Experience Report, Jan. 3, 2005, pp. 1-8.*

(Continued)

*Primary Examiner* — George A Bugg
*Assistant Examiner* — Edny Labbees
(74) *Attorney, Agent, or Firm* — Workman Nydegger

(57) ABSTRACT

The subject invention provides a system and/or a method that facilitates employing a security technique to an RFID network. An interface can receive role-based authorization data related to an operating system. A security component can enhance security to at least one of a manipulation of a process and a utilization of a device within the RFID network based at least in part upon role-based authorization data.

20 Claims, 10 Drawing Sheets

U.S. PATENT DOCUMENTS

| | | | |
|---|---|---|---|
| 6,873,260 B2 * | 3/2005 | Lancos et al. | 340/573.1 |
| 6,908,034 B2 | 6/2005 | Alleshouse | |
| 6,943,683 B2 | 9/2005 | Perret | |
| 7,148,803 B2 * | 12/2006 | Bandy et al. | 340/539.16 |
| 7,155,305 B2 | 12/2006 | Hayes et al. | |
| 7,204,409 B2 | 4/2007 | Kumar et al. | |
| 7,257,108 B2 * | 8/2007 | Cheston et al. | 370/338 |
| 7,267,275 B2 | 9/2007 | Cox et al. | |
| 7,290,708 B2 | 11/2007 | Haller | |
| 7,327,259 B2 * | 2/2008 | Kim et al. | 340/572.1 |
| 7,424,744 B1 * | 9/2008 | Wu et al. | 726/23 |
| 7,426,484 B2 | 9/2008 | Joyce | |
| 7,533,812 B2 | 5/2009 | Kumar | |
| 7,640,547 B2 * | 12/2009 | Neiman et al. | 718/104 |
| 7,640,574 B1 * | 12/2009 | Kim et al. | 726/1 |
| 7,756,969 B1 | 7/2010 | Clarke | |
| 2002/0004787 A1 | 1/2002 | Moshal | |
| 2002/0059471 A1 | 5/2002 | Sanghvi et al. | |
| 2002/0070865 A1 | 6/2002 | Lancos et al. | |
| 2002/0095454 A1 | 7/2002 | Reed | |
| 2002/0143624 A1 | 10/2002 | Catan | |
| 2002/0170952 A1 | 11/2002 | Alsafadi et al. | |
| 2003/0061062 A1 | 3/2003 | Tucker | |
| 2003/0135576 A1 | 7/2003 | Bodin | |
| 2003/0144926 A1 | 7/2003 | Bodin et al. | |
| 2003/0155413 A1 * | 8/2003 | Kovesdi et al. | 235/375 |
| 2003/0225928 A1 | 12/2003 | Paul | |
| 2003/0227392 A1 | 12/2003 | Ebert et al. | |
| 2004/0016796 A1 | 1/2004 | Hanna | |
| 2004/0046642 A1 | 3/2004 | Becker et al. | |
| 2004/0070491 A1 | 4/2004 | Huang et al. | |
| 2004/0102995 A1 | 5/2004 | Boppana | |
| 2004/0111335 A1 | 6/2004 | Black et al. | |
| 2004/0133484 A1 | 7/2004 | Kreiner | |
| 2004/0181461 A1 | 9/2004 | Raiyani | |
| 2004/0193641 A1 | 9/2004 | Lin | |
| 2004/0215667 A1 | 10/2004 | Taylor et al. | |
| 2004/0217864 A1 | 11/2004 | Nowak | |
| 2004/0222298 A1 | 11/2004 | Dearing | |
| 2004/0233040 A1 * | 11/2004 | Lane et al. | 340/5.86 |
| 2004/0238635 A1 | 12/2004 | Ozaki | |
| 2004/0245332 A1 | 12/2004 | Silverbrook | |
| 2004/0250066 A1 | 12/2004 | Di Luoffo | |
| 2005/0033619 A1 * | 2/2005 | Barnes et al. | 705/7 |
| 2005/0062603 A1 * | 3/2005 | Fuerst et al. | 340/539.12 |
| 2005/0068190 A1 | 3/2005 | Krause | |
| 2005/0092825 A1 | 5/2005 | Cox et al. | |
| 2005/0108628 A1 | 5/2005 | Grambihler | |
| 2005/0119984 A1 | 6/2005 | Rouvellou | |
| 2005/0138402 A1 * | 6/2005 | Yoon et al. | 713/193 |
| 2005/0150952 A1 | 7/2005 | Chung | |
| 2005/0150953 A1 | 7/2005 | Alleshouse | |
| 2005/0237194 A1 | 10/2005 | VoBa | |
| 2006/0047789 A1 | 3/2006 | Kumar | |
| 2006/0116160 A1 | 6/2006 | Fuccello | |
| 2006/0195473 A1 | 8/2006 | Lin | |
| 2007/0024463 A1 * | 2/2007 | Hall et al. | 340/825.69 |
| 2007/0243925 A1 | 10/2007 | LeMay | |

FOREIGN PATENT DOCUMENTS

| | | |
|---|---|---|
| WO | WO 03/102845 | 7/2003 |
| WO | 03102845 | 12/2003 |
| WO | WO 2005078633 | 8/2005 |

OTHER PUBLICATIONS

European Search Report dated Mar. 9, 2006 mailed Mar. 22, 2006 for European Patent Application Serial No. EP05107794, 7 Pages.

Anonymous: "The Sun Global RFID Betwork Vision: Connecting Businesses at the Edge of Network" Internet Article, Jul. 2004, http://www.sun.com/software/solutions/rfid/Sun_RFIS_Vision_rla.pdf.

U.S. Appl. No. 11/025,702, filed Feb. 18, 2005, Kumar, et al.

U.S. Appl. No. 11/061,337, filed Mar. 1, 2005, Kumar, et al.

U.S. Appl. No. 11/069,459, filed Feb. 18, 2005, Kumar, et al.

U.S. Appl. No. 11/061,356, filed May 31, 2005, Kumar, et al.

U.S. Appl. No. 11/141,619, filed May 31, 2005, Kumar, et al.

U.S. Appl. No. 11/140,726, filed May 31, 2005, Kumar, et al.

U.S. Appl. No. 11/141,533, filed May 31, 2005, Agarwal, et al.

European Search Report dated Oct. 2, 2006, mailed Feb. 10, 2006 for European Patent Application Seial No. 05107796, 6 pages.

Tsetsos, et al. "Commerical Wireless Sensor Networks: Technical and Business Issues" Proceedings of the Second Annual Conference on Wireless On-Demand Network Systems and Services (Jan. 19-21, 2005) 8 pages.

Branch, et al. "Sentire: A Framwork for Building Middleware for Sensor and Actuator Networks" Proceedings of the Third International Conference on Pervasive Computing and Communications Workshops, Mar. 8, 2005) pp. 396-400.

Harrison, et al. "Information Management in the Product Lifecycle—the Role Networked RFID" Proceedings of the Second IEE International Conference (Jun. 24, 2004) pp. 507-512.

Bornhovd, et al. "Integrating Smart Items with Business Processes An Experience Report" Proceedings of the Thirt-Eighth Hawaii International Conference on System Science (Jan. 3, 2005) 8 pages.

Ganesh, et al. "Web Services and Multi-Channel Integration: A Proposed Framework" Proceedings of the IEEE International Conference on Web Services (Jul. 6, 2004) 8 pages.

European Search Report dated Feb. 6, 2006, mailed Feb. 6, 2006 for European Patent Application Seial No. 05107826, 7 pages.

Ortiz. "An Introduction to Java Card Technology—Part 1" http://developers.sun.com/techtopics/mobility/javacard/articles/javacard1/> last viewed Dec. 19, 2005, 14 pages.

Chen. "Understanding Java Card 2.0" URL:.com//javaworld/jw-03-1998/jw-03-javadev_p.html> last viewed Dec. 19, 2005, 12 pages.

IBM "alphaWorks: RFID Device Development Kit: Overview" http://www/alphaworks.ibm.com/tech/rfiddevice last viewed Nov. 7, 2005, 1 page.

ALIEN "ALR-9800 Enterprise RFID Reader" http://www.alientechnology.com/docs/AT_DS_9800_v3_WEB.pdf last viewed Nov. 17, 2005, 4 pages.

Eurpoean Search Report dated Feb. 7, 2006; mailed Feb. 7, 2006 for PCT Application Serial No. EP 05 10 8001; 7 pages.

U.S. Appl. No. 60/606,281, filed Sep. 1, 2004, Kumar, et al.

U.S. Appl. No. 60/606,577, filed Sep. 2, 2004, Kumar, et al.

U.S. Appl. No. 11/025,702, filed Dec. 29, 2004, Kumar, et al.

U.S. Appl. No. 11/061,337, filed Feb. 18, 2005, Kumar, et al.

U.S. Appl. No. 11/061,356, filed Feb. 18, 2005, Kumar, et al.

U.S. Appl. No. 11/069,459, filed Mar. 1, 2005, Kumar, et al.

U.S. Appl. No. 11/140,726, filed May 31, 2005, Agarwal, et al.

QA Received Dec. 10, 2008 for Chinese Application Serial No. 200510091693.0, 10 Pages.

Office Action dated Jul. 31, 2009 cited in U.S. Appl. No. 11/061,337.

U.S. Appl. No. 11/192,877, filed Aug. 11, 2010, Office Action.

U.S. Appl. No. 11/192,877, mailed Dec. 15, 2010, Office Action.

Author Unknown, "Does Your Project Need a Rule Engine", Copyright 2008 Sys-Con Media, Downloaded Oct. 13, 2009 <http://java.sys-con.com/node/45082/print>.

Notice of Allowance dated Jan. 12, 2010 cited in U.S. Appl. No. 11/061,337.

European Search Report dated Oct. 4, 2006 and mailed Apr. 11, 2006 for EP 05108005, 9 pages.

European Seach Report dated May 11, 2006, mailed May 12, 2006 for European Patent Application Serial No. EP05107744, 9 pages.

European Search Report dated Mar. 9, 2006, mailed Mar. 27, 2006 for European Patent Application Serial No. EP05107744, 7 pages.

International Search Report dated and mailed Jul. 27, 2007 for PCT Application Serial No. PCT 2007/004005, 6 pages.

U.S. Appl. No. 11/061,356, mailed Nov. 17, 2010, Office Action.

Floerkemier, et al. "PML Core Specification 1.0" Sep. 13, 2003, Auto-ID Center, Version 1.0, 48 pages.

* cited by examiner

SECURITY TECHNIQUES IN THE RFID FRAMEWORK

CROSS-REFERENCE TO RELATED APPLICATION(S)

This application claims the benefit of U.S. Provisional Patent Application Ser. No. 60/606,281 filed on Sep. 1, 2004, entitled "SYSTEM AND METHODS THAT FACILITATE RFID SERVER PROGRAMMING MODEL AND API'S," and U.S. Provisional Patent Application Ser. No. 60/606,577 filed on Sep. 2, 2004, entitled "FACILITATE RFID SERVER PROGRAMMING MODEL AND API'S." This application is also related to co-pending U.S. patent application Ser. Nos. 11/069,459, 11/025,702, 11/061,356, and 11/061,337 filed on Mar. 1, 2005, Dec. 29, 2004, Feb. 18, 2005, and Feb. 18, 2005, respectively. The entireties of these applications are incorporated herein by reference.

BACKGROUND OF THE INVENTION

Many retail, manufacture, and distribution establishments are applying different and innovative operating methods to increase efficiency. These establishments can monitor store inventory to facilitate optimizing supply and demand relating to consumers. One aspect of maximizing profit hinges on properly stocking inventory such that replenishment occurs in conjunction with exhaustion of goods and/or products. For example, a retailer selling a computer and/or a VCR, must stock the computer in relation to its consumer sales, and the VCR in relation to its consumer sales. Thus, if the computer is in higher demand (e.g., more units sold) than the VCR, the retailer can stock the computer more frequently in order to optimize supply and demand, and in turn, profit. Monitoring inventory and associated sales can be a complex task, wherein product activity is comparable to a black box since inner workings are unknown; yet monitoring products is a crucial element in inventory/product efficiency.

Automatic identification and data capture (AIDC) technology, and specifically, Radio Frequency Identification (RFID) has been developed based at least upon the need to cure deficiencies of typical monitoring systems and/or methodologies (e.g., barcode readers, barcodes, and/or UPCs). RFID is a technique of remotely storing and retrieving data utilizing RFID tags. Since RFID systems are based upon radio frequency and associated signals, numerous benefits and/or advantages precede traditional techniques in monitoring products. RFID technology does not require a line of sight in order to monitor products and/or receive signals from RFID tags. Thus, no manual scan is necessary wherein the scanner is required to be in close proximity of the target (e.g., product). Yet, range is limited in RFID based upon radio frequency, RFID tag size, and associated power source. Additionally, RFID systems allow multiple reads within seconds providing quick scans and identification. In other words, an RFID system allows a plurality of tags to be read and/or identified when the tags are within a range of an RFID reader. The capability of multiple reads in an RFID system is complimented with the ability of providing informational tags that contain a unique identification code to each individual product.

Moreover, RFID systems and/or methodologies provide real-time data associated with a tagged item. Real-time data streams allow a retailer, distributor, and/or manufacturer the ability to monitor inventory and/or products with precision. Utilizing RFID can further facilitate supplying products on a front-end distribution (e.g., retailer to consumer) and a back-end distribution (e.g., distributor/manufacturer to retailer). Distributors and/or manufacturers can monitor shipments of goods, quality, amount, shipping time, etc. In addition, retailers can track the amount of inventory received, location of such inventory, quality, shelf life, etc. The described benefits demonstrate the flexibility of RFID technology to function across multiple domains such as, front-end supply, back-end supply, distribution chains, manufacturing, retail, automation, etc.

An RFID system consists of at least an RFID tag and an RFID transceiver. The RFID tag can contain an antenna that provides reception and/or transmission to radio frequency queries from the RFID transceiver. The RFID tag can be a small object, such as, for example, an adhesive sticker, a flexible label and integrated chip, etc. There are typically four different frequencies the RFID tags utilize: low frequency tags (between about 125 to 134 kilohertz), high frequency tags (about 13.56 megahertz), UHF tags (about 868 to 956 megahertz) and Microwave tags (about 2.45 gigahertz).

In general, an RFID system can include multiple components: tags, tag readers (e.g., tag transceivers), tag writers, tag-programming stations, circulation readers, sorting equipment, tag inventory wands, etc. Such devices and, in general, RFID systems are exposed to security threats based solely on the characteristics which out-perform traditional and/or conventional systems. The RFID systems and devices are vulnerable and would be inept albeit for security measures associated therewith. With the growth of RFID systems, and in particular RFID devices, enhancing and improving security is an increasing concern to protect the quality and integrity of such devices and systems.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention relates to systems and/or methods that facilitate employing security to an RFID network. A security component can incorporate a role-based authorization model associated with an operating system to an RFID network to provide various security levels, wherein the RFID network can be a collection of devices that form a sub-system based at least in part upon a process, a location, an event, and/or functionality. The security component can utilize the role-based authorization model from the operating system to prevent malicious attacks in relation to at least one of a manipulation of a process within the RFID network and the accessibility and/or utilization of a device (e.g., an RFID reader, an RFID writer, an RFID printer, a printer, a reader, a writer, an RFID transmitter, an antenna, a sensor, a real-time device, an RFID receiver, a real-time sensor, a device extensible to a web service, and a real-time event generation system) within the RFID network.

In accordance with one aspect of the subject invention, the security component can include a role component that can create an RFID administrator and an RFID user group with respective permissions. The RFID administrator can manipulate the process within the RFID network, wherein the manipulation can be an execution, a modification, a creation, a deletion (e.g., a termination), and/or a deployment (e.g., an initiation). The RFID administrator can incorporate a user and/or a group from the operating system, wherein the user/group hierarchy is implemented within the RFID network. In addition, the RFID administrator can dictate permissions to a user and/or a group in relation to a more restricted manipulation of such processes. The user and/or group that have been permitted to the restricted manipulations of the process can further dictate permission related to the restricted manipulation of such processes. Furthermore, the RFID administrator can dictate permissions related to the access and/or utilization of the device within the RFID network.

In accordance with another aspect of the subject invention, the security component can include an analyzer component that can determine the characteristics related to the authorization model within the operating system to facilitate integrating such roles into the RFID network. Moreover, the analyzer component can determine various vulnerabilities and/or threats associated with the RFID network, wherein such detected weaknesses can be eliminated via track model analysis. In accordance with another aspect, the security component can utilize a manager component that manages at least one of a role and permission associated with the RFID network.

In accordance with still another aspect, the security component can include a threat component that can utilize track model analysis, wherein a threat can be determined and adequate protection can be provided accordingly. The threat component can detect various threats by manual techniques, automatic techniques, and/or any combination thereof to dynamically perceive various threats and/or security vulnerabilities in relation to the RFID network. In particular, the threat component can detect threats associated to the manipulation of the process within the RFID network and/or the accessibility and/or utilization of a device within the RFID network.

In accordance with another aspect of the subject invention, the security component can further include an API component. The API component can modify permissions associated with at least one of an RFID administrator and an RFID user group. Furthermore, the security component can include a notification component that can notify an administrator of a breach, potential breach, and/or an attempted breach. Also, the notification component can notify the administrator of an internal breach and/or an external breach. In other aspects of the subject invention, methods are provided that facilitate employing security to an RFID network.

The following description and the annexed drawings set forth in detail certain illustrative aspects of the invention. These aspects are indicative, however, of but a few of the various ways in which the principles of the invention may be employed and the subject invention is intended to include all such aspects and their equivalents. Other advantages and novel features of the invention will become apparent from the following detailed description of the invention when considered in conjunction with the drawings.

DESCRIPTION OF THE INVENTION

Figure 1:
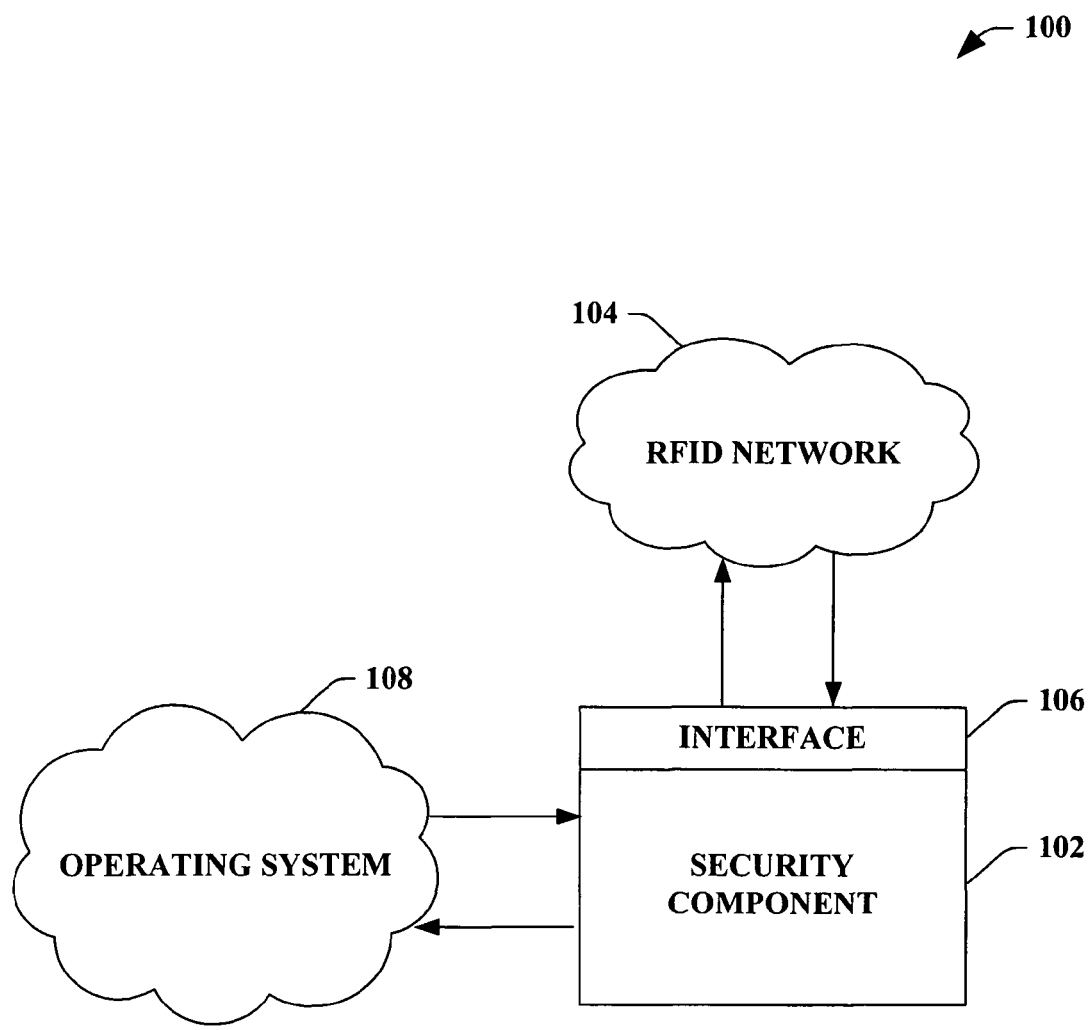
FIG. 1 illustrates a block diagram of an exemplary system that facilitates employing a security technique to an RFID network.

As utilized in this application, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The subject invention is described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

Now turning to the figures, FIG. 1 illustrates a system 100 that facilitates employing a security technique to radio frequency identification (RFID) network. A security component 102 can employ a security technique to an RFID network 104 based at least in part upon a characteristic associated with an operating system 108. The security component 102 can provide protection against security breaches aimed toward a process within the RFID network 104 and/or a device within the RFID network 104. The process and/or device within the RFID network 104 are key assets within a server infrastructure which can be exposed to various threats that could arise out of malicious attacks. In other words, the security component 102 can protect the process and/or device, wherein the process can be a deployable RFID process that models the logical processing pipeline for a system of device and/or device collections and the device is part of the physical device collection that the process can communicate. It is to be appreciated that the device can be, but is not limited to, an RFID reader, an RFID writer, an RFID printer, a printer, a reader, a writer, an RFID transmitter, an antenna, a sensor, a real time device, an RFID receiver, a real time sensor, a device extensible to a web service, a real time event generation system, etc. Moreover, although the security component 102 is depicted to be a stand-alone component, it is to be appreciated that the security component 102 can be incorporated into the RFID network 104, the operating system 108, and/or any combination thereof.

In one example, the RFID network 104 can include at least one RFID device that is associated with at least one RFID process. It is to be appreciated that the RFID process can utilize any suitable number of devices within the RFID network 104. The process can be related to a particular RFID sub-system (e.g., an RFID server, RFID network, etc.) that is an uber or high-level object that forms together various entities to create a meaningful unit of execution. The process can be an outbound process (e.g., pick, pack, shipping scenario, etc.), a manufacturing process, a shipping process, a receiving process, tracking, data representation, data manipulation, data application, security, . . . . Additionally, the process can include an RFID device service, a tag read, an event (e.g., a tag read, a tag read error, a device up event, a device down event, and a management event), a tag write, a device configuration, a geographic tracking, a number count, etc.

The security component 102 can invoke security measures to the RFID network 104 to secure and/or protect the process and/or device to deter malicious attacks. The security component 102 can protect devices associated with a process and the process that utilizes such devices. The operating system 108 can be any suitable operating system that utilizes a role-based authorization model and/or data. For example, the operating system 108 can incorporate an administrator, a group, and/or a user. Such role-based authorization allows tiered levels (e.g., hierarchy) of authorization based at least in part upon the administrator's discretion. In one example, the group can be configured based on roles that users play in an organization such as warehouse manager, warehouse employee, DC manager, store employee, etc. Such groups can be selectively assigned various security levels, wherein a particular user and/or group can be given rights to perform specific tasks.

The security component 102 can incorporate the role-based authorization model and/or data associated with the operating system 108 to provide substantially similar security and/or authorization in relation to the RFID network 104. In particular, the security component 102 can provide role-based authorization to a process and/or a device within the RFID network 104. Thus, manipulations associated with processes and/or utilization of devices within the RFID network 104 can be restricted based at least in part upon the role-based authorization model within the operating system 108.

The system 100 further includes an interface component 106, which provides various adapters, connectors, channels, communication paths, etc. to integrate the security component 102 into virtually any operating and/or database system(s). In addition, the interface component 106 can provide various adapters, connectors, channels, communication paths, etc., that provide for interaction with the security component 102, the RFID network 104, and the operating system 108. It is to be appreciated that although the interface component 106 is incorporated into the security component 102, such implementation is not so limited. For instance, the interface component 106 can be a stand-alone component to receive or transmit data in relation to the system 100.

Figure 2:
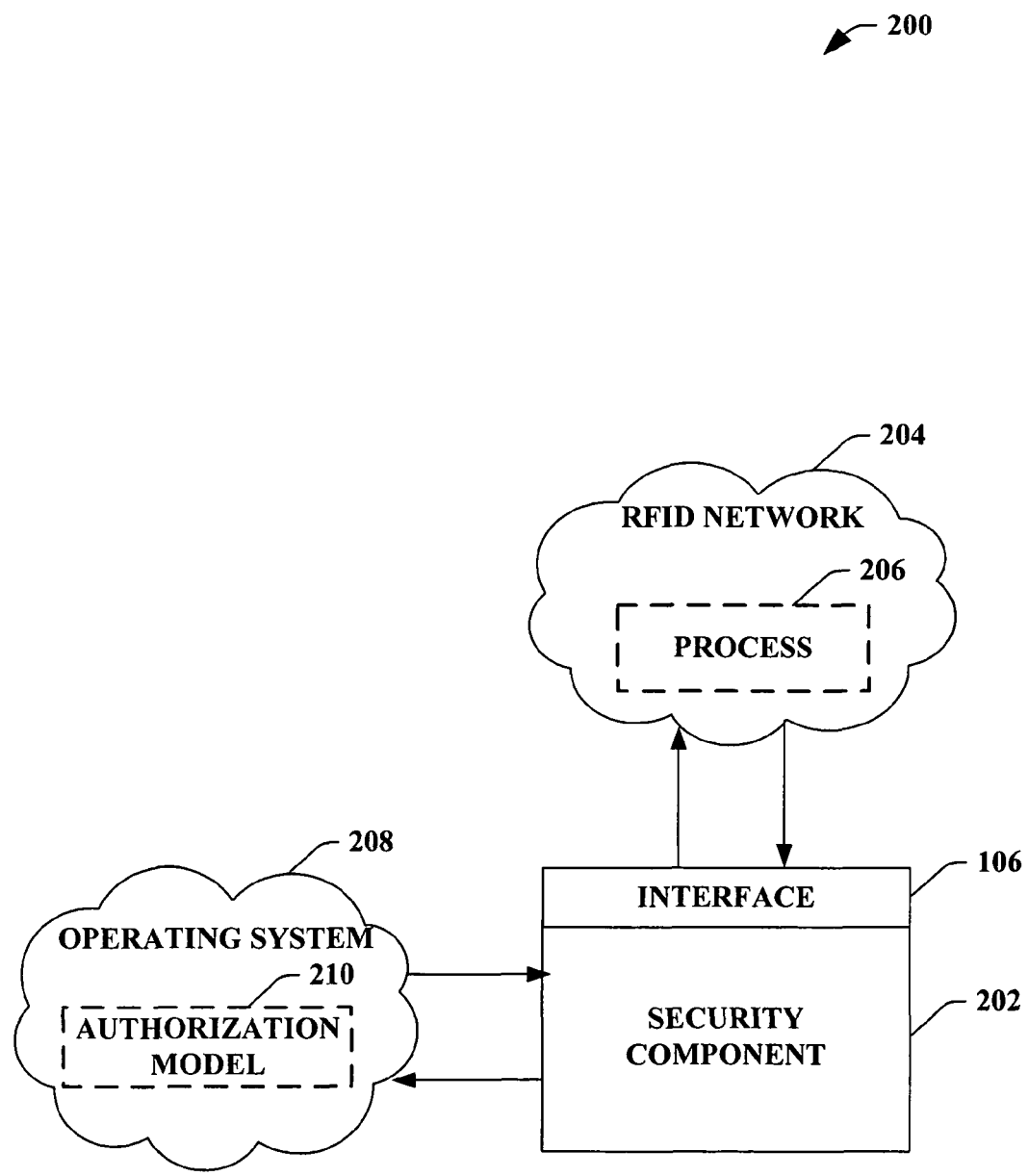
FIG. 2 illustrates a block diagram of an exemplary system that facilitates invoking a role-based authorization model to an RFID network utilizing an operating system.

FIG. 2 illustrates a system 200 that facilitates invoking a role-based authorization model and/or data to an RFID network utilizing an operating system. A security component 202 can invoke at least one security measure based at least in part upon an authorization model 210 within an operating system 208 to an RFID network 204. The security component 202 can provide a role-based authorization and/or protection that can be applied to a device (not shown) and/or a process 206 within the RFID network 204. It is to be appreciated that although one process 206 is depicted within the RFID network 204, the subject invention is not so limited and a plurality of processes can exist therein. The authorization model 210 can be utilized by the security component 202 to implement a substantially similar security technique to the RFID network 204, and in particular to the manipulation of the process 206 and/or the accessibility of the device (e.g., a process level and/or a device level). It is to be appreciated that the security component 202, the operating system 208, and the RFID network 204 can be substantially similar to the security component 102, the operating system 108, and the RFID network 104 as depicted in FIG. 1.

For example, the security component 202 can invoke security techniques in relation to the process 206 and/or the device(s) within the RFID network 204. The operating system 208 can contain an administrator, a warehouse manager group, and a warehouse employee group, wherein each group contains at least one user. In other words, the operating system 208 utilizes a role-based authorization model and/or data. The security component 202 can create an additional administrator (e.g., RFID administrator) and at least one group (e.g., RFID user group), wherein users and/or groups within the operating system 208 can be incorporated into the RFID network 204 providing various security layers. It is to be appreciated that the rights associated with the RFID administrator and the RFID user group can be disparate and/or pre-defined based at least in part upon the security that is to be implemented. For example, the rights of the RFID administrator are supreme in relation to any user therewith. Thus, the security component 202 can incorporate the role-based authorization model 210 within the operating system 208 to secure and/or protect the process(es) 206 and/or devices within the RFID network 204.

Furthermore, the RFID network 204 can include at least one device (e.g., an RFID reader, an RFID writer, an RFID printer, a printer, a reader, a writer, an RFID transmitter, an antenna, a sensor, a real-time device, an RFID receiver, a real-time sensor, a device extensible to a web service, a real-time event generation, etc.) that is associated with at least one RFID process 206. The RFID network 204 can include various sub-systems based at least in part upon location, function, and/or process 206. For example, an RFID network 204 can be two groups and/or collections of devices, one at a shipping door and another at a receiving door. Such RFID network 204 can further include a process 206 associated with each group and/or collection of devices based at least in part upon the group and/or collection name, location, and/or process name. For instance, the process 206 can be a shipping process that is related to the devices at the shipping door, wherein the devices can collect data at such location. Similarly, another process 206 can be a receiving process that is related to the devices at the receiving door, wherein the devices can collect data at such location. The security component 202 can secure and/or protect the manipulation of the process 206 and/or the accessibility of the device within the RFID network 204 based at least in part upon the role-based authorization model 210 associated with the operating system 208.

The process 206 is an uber and/or high-level object that can provide a meaningful unit of execution. For instance, the process 206 can be a shipping process that represents multiple devices at various dock doors working together to perform tag reads, filtering, read enrichment, alert evaluation, and data storage in a sink for a host application to retrieve/process. In another example, the process 206 can execute a manufacturing process, wherein devices are configured to read as well as write dependent upon a location. Moreover, additional functions such as filtering, enriching, etc. can be implemented at the location. In yet another example, the process 206 can write to a tag process, wherein a tag can be written in real-time based at least upon an input. The write process can also check if the write succeeded by reading and passing data back to the host. A manipulation (e.g., creation, execution, deployment, modification, deletion, an initiation; and a termination, . . . ) of the process 206 can be secured and/or protected by the security component 202.

In one example, the security component 202 can provide access to the process 206 and the device based at least in part upon a list of authorization groups associated with the process 206. The authorization group consists of a user defined name for the authorization group, a flag specifying the read-execute/modify-delete/both access level and a list of operating system users and/or groups. It is to be appreciated that the list can be potentially extended to structure query language (SQL) users and/or roles. Such authorization group can be a named object that when associated with the process 206 and device artifacts that specifies the list of RFID store users and the access level to that artifact for all of them.

Figure 3:
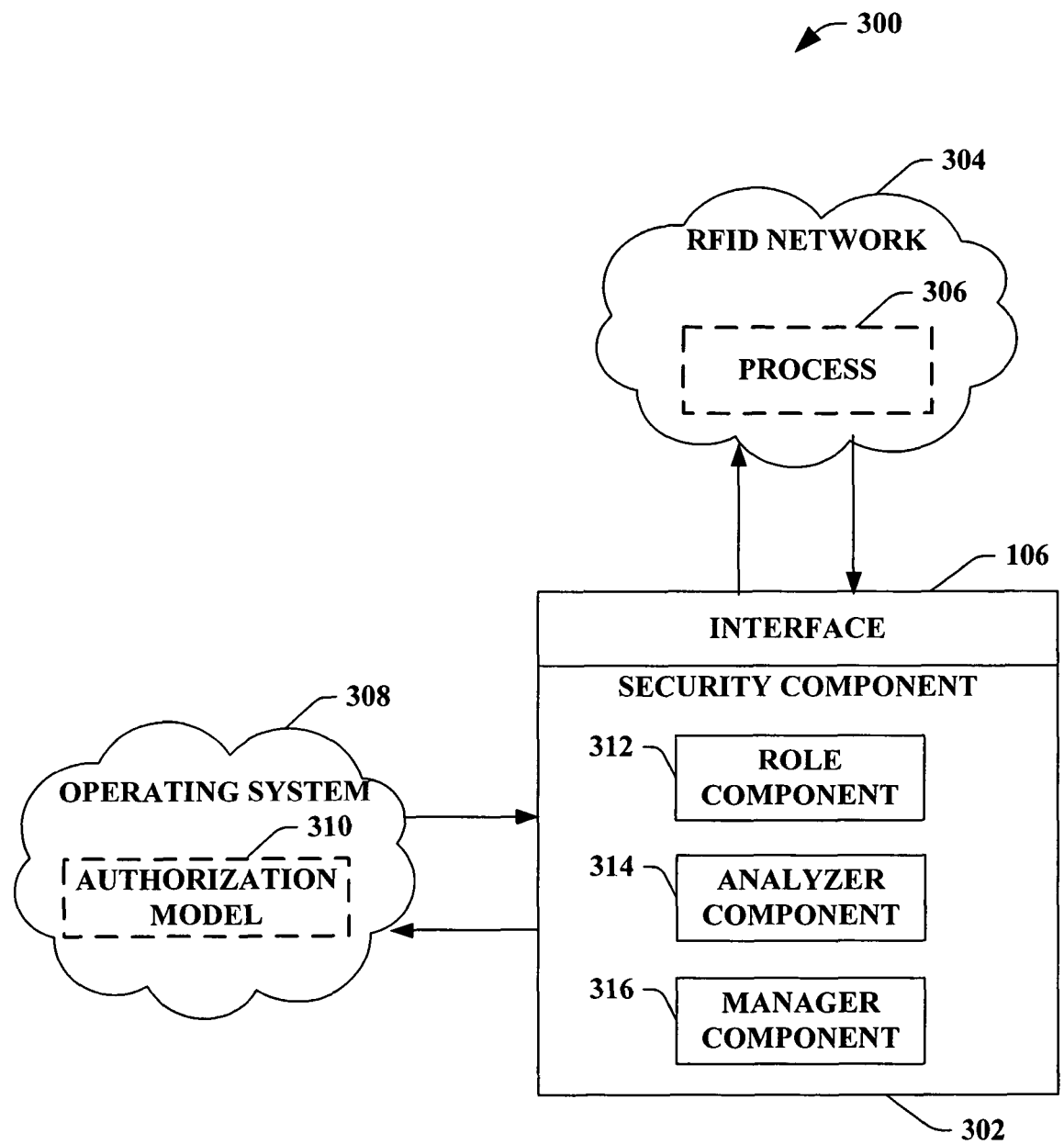
FIG. 3 illustrates a block diagram of an exemplary system that facilitates implementing a role-based security technique to an RFID network in conjunction with an operating system.

FIG. 3 illustrates a system 300 that facilitates implementing a role-based security technique to an RFID network in conjunction with an operating system. A security component 302 protects and/or secures the manipulation of a process 306 and/or the accessibility of a device (not shown) within an RFID network 304 based at least in part upon an authorization model 310 associated with an operating system 308. The security component 302 can provide a first security layer related to the process 306 and a second security layer related to at least one device. It is to be appreciated that the security component 302, the operating system 308, and the RFID network 304 can be substantially similar to the security component 202, 102, the operating system 208, 108, and the RFID network 204, 104 of FIGS. 2 and 1 respectively.

The security component 302 can include a role component 312 that can initiate and/or apply a general role and/or a role permission/right/attribute to provide security within the RFID network 304. The role component 312 can provide at least one guideline and/or rights to be enforced in association with the role-based authorization model 310 associated with the operating system 308. The guidelines and/or rights relating to the manipulation of the process 306 and/or utilization of a device with the process 306 can be based at least in part upon a track model analysis that facilitates the limitation of at least one threat to the system 300. In other words, the role-based authorization model 310 can be incorporated into the RFID network 304, wherein specific rights and/or attributes can be assigned accordingly.

For instance, the role component 312 can utilize two general roles such as an RFID administrator and at least one RFID user group containing at least one user, wherein the RFID administrator and the RFID user group has respective attributes, guidelines, and/or rights. The roles (e.g., warehouse manager, warehouse employee, dc manager, store employee, etc.) associated with the operating system 308 can be assigned (e.g., by the RFID administrator) to the RFID user group to reflect substantially similar hierarchy. In relation to processes, the RFID administrator can manipulate (e.g., create, execute, deploy, modify, delete, . . . ) any process 306 within the RFID network 304. Furthermore, the RFID administrator can add any user to have limited rights to a specific process or processes. Once added to a particular process by the RFID administrator, the user can create, modify, and execute the process 306 and add another user to the particular process. Yet, the RFID administrator can further dictate permissions related to device accessibility and/or utilization of devices with the process 306. In other words, the user (regardless of rights to the process 306) may not access a device if the RFID administrator restricts such device. The role component 312 can incorporate rights according to the above examples, wherein the RFID administrator can dictate permissions of the incorporated users and/or groups from the operating system 308. In addition, the RFID administrator can remove and/or retract a user's permission list.

The security component 302 can include an analyzer component 314 that can analyze various data associated with the system 300 to facilitate employing security techniques to provide protection to at least one of the manipulation of the process 306 and/or utilization of a device within the RFID network 304. In one example, the analyzer component 314 can analyze the operating system 308 and determine the role-based authorization model 310 associated therewith to incorporate such roles into the RFID network 304. The analyzer component 314 can determine the various roles associated with the operating system 308 which allows the role component 312 to incorporate such roles with respective rights. In another example, the analyzer component 314 can analyze possible threats and/or breaches to the security relating to at least one of the manipulation of the process 306 and/or utilization/accessibility of a device. In other words, the analyzer component 314 can determine a possible breach within security and incorporate the appropriate roles and/or rights to eliminate such breach possibility.

The security component 302 can further include a manager component 316 that manages the roles, attributes, and/or rights associated with the security component 302. The manager component 316 can provide the addition groups, creation of groups, deletion of groups, right assignment, etc. in relation to the security component 302. For example, the manager component 316 can edit (e.g., add, delete, modify, create, . . . ) the rights associated with a role and/or group incorporated from the operating system 308. Moreover, the manager component 316 can edit the users associated with a group within the RFID network 304. In one example, the manager component 316 can be utilized by the RFID administrator, wherein complete managerial aspects are dictated thereby. It is to be appreciated that the manager component 316 can manage various aspects in relation to the roles and/or authorizations incorporated from the operating system 308. Furthermore, although the manager component 316 is incorporated into the security component 302, the subject invention is not so limited. It is to be appreciated that the manager component 316 can be a stand-alone component, incorporated into the RFID network 304, incorporated into the operating system 308, and/or any combination thereof.

Figure 4:
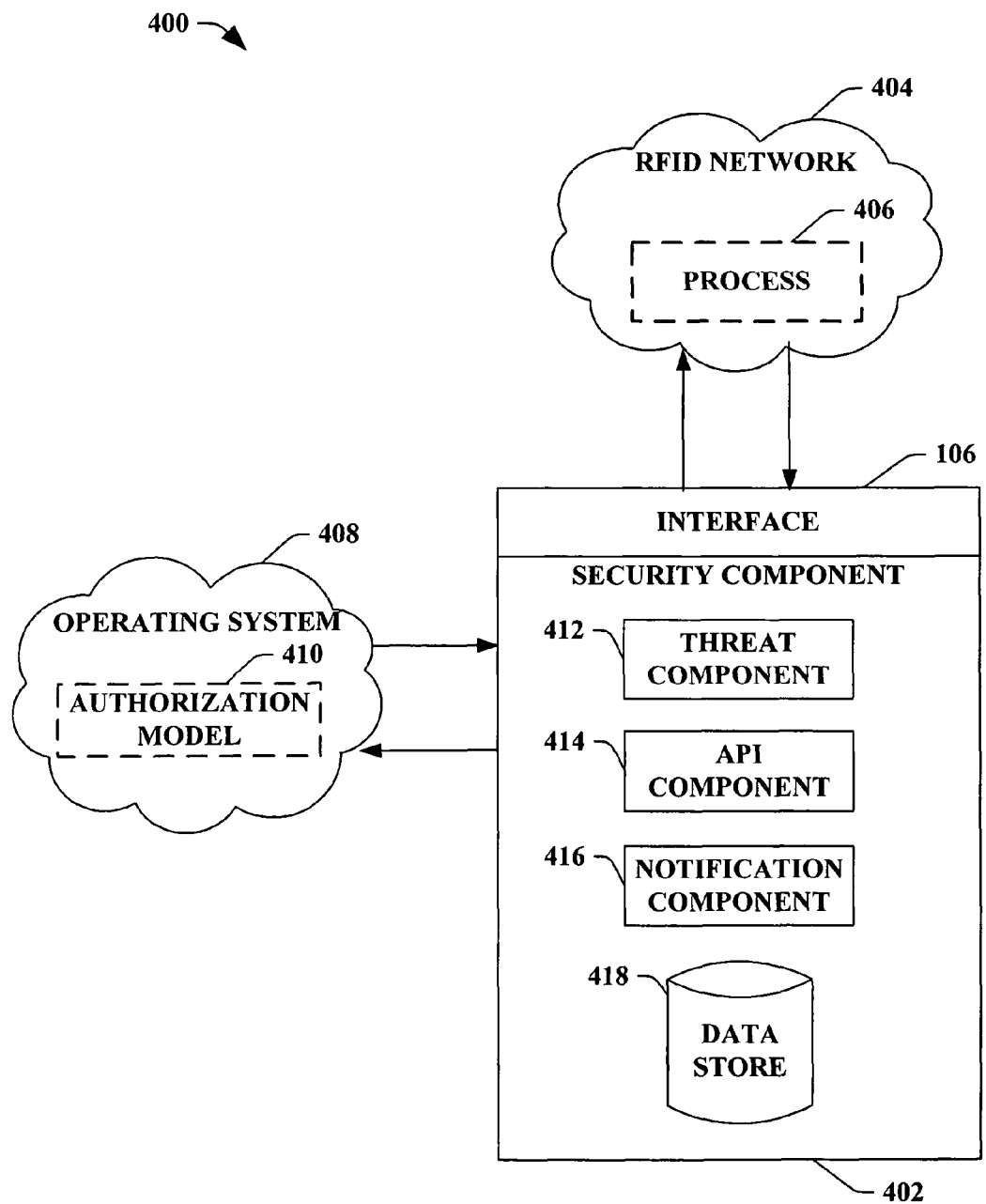
FIG. 4 illustrates a block diagram of an exemplary system that facilitates providing at least one security technique to an RFID network in association with an operating system.

FIG. 4 illustrates a system 400 that facilitates providing at least one security technique to an RFID network in association with an operating system. A security component 402 can incorporate security levels associated with a manipulation of a process 406 and/or a utilization of a device within an RFID network 404. The security component 402 can create an RFID administrator and an RFID user group, wherein the RFID administrator can incorporate at least one characteristic (e.g., role, group, user, . . . ) from an authorization model 410 within an operating system 408. In other words, the RFID administrator can incorporate the characteristics within the operating system to provide a substantially similar hierarchy of security. It is to be appreciated that the security component 402, the RFID network 404, and the operating system 408 can be substantially similar to respective components and/or networks described in previous figures.

In one example, the RFID administrator has top priority in rights, wherein no user and/or group can over-step such authority. The RFID administrator can add users to groups, delete users from groups, create new groups, create new users, modify groups, modify rights associated with a group and/or user, execute processes, deploy processes, create processes, modify processes, provide permission on device utilization, etc. Once added by the RFID administrator to the process 406, the user and/or group can create the process 406, modify the process 406, delete the process 406, add another user and/or group to the process 406, but not deploy and/or execute the process 406. It is to be appreciated that the RFID administrator can dictate permissions on various devices within the RFID network 404, wherein if a device is not granted permission, the process 406 associated with such device may not be manipulated regardless of rights related to the process 406.

The security component 402 can utilize a threat component 412 that can utilize track model analysis to determine a threat and provide adequate protection accordingly. Track model analysis can be invoked to provide a trust forming initiative, wherein at least one threat can be mapped to the platform (e.g., system 400) in terms of security to provide a security model. The kinds of infractions can be listed and the resources, entry points, trust levels, data flow diagrams, and ways of compromised can be determined. Such information can lead to a list of threats, from which vulnerabilities can be exposed to allow the security component 402 protect from such vulnerabilities.

The security component 402 provides security related to the manipulation of a process and/or the utilization of a device within the RFID network 404. Numerous threats can be associated with the key assets (e.g., processes, devices, . . . ) to the RFID network 404, wherein the threat component 412 can determine and protect against such threats. The following threats can be seen as examples and not exhaustive to which the security component 402 can analyze to provide appropriate protection. The process 406 can be exposed to the unauthorized creation of a process. For instance, a malicious user could potentially create a logical RFID process that 1) siphons information that is being collected; and/or 2) does not reflect the business function expected out of an RFID deployment (e.g., an incorrect shipping and/or receiving process) for other gains. The process 406 can be exposed to an unauthorized deployment, modification, and/or deletion. A malicious user can execute RFID logic when it is not suppose to be executed (e.g., turn warehouse devices on and scan inventory and count via the deployment of count process) if not restricted (e.g., unless super users are present and the system is able to sand-box other users to give them permissions to do only what they are allowed). Such scenario includes malicious modification, deletion of business logic encompassed in a running process for other gains.

Additionally, the device can be exposed to various threats. The following examples are not to be limiting to the subject invention. The device can be exposed to a physical attack via a host. An attacker can perform physical probing and/or alteration of a device. In a probing attacking, the goal of the attacker is to obtain any of the items listed in device properties, data sent to tags, as well as device firmware. The device configuration can also be altered, wherein an attacker can attempt to alter the device configuration in an attempt to cause the device to misreport tag events including over-reporting, under-reporting, and/or reporting tag events to unauthorized hosts. The device-host exchange can be eavesdropped. An attacker may attempt to eavesdrop on communications between the device and the host including protocol data frames from device and host, and data sent to the device from the host.

Moreover, the injection of reader and/or host data frames can be a threat to the device within the RFID network 404. An attacker can inject data frames masquerading as the device or host including protocol data frames from device and host and data sent to the device from the host. An attacker can further inject data frames and/or physical layer noise to disrupt the communications availability of the device and host providing a denial of service on device-host data exchange. Further, an attacker can attempt to introduce an unauthorized device and/or host to propose a threat to the system 400. The threat component 412 can aim to solve the above mentioned issued by the application and/or user of existing security mechanisms in the operating system 408 platform in a specific manner to protect the aforementioned RFID framework entities from the type of threats defined.

The security component 402 can invoke an application program interface (API) component 414 (herein referred to as "API 414"). The API 414 can be invoked, for example, at runtime to edit various roles and/or attributes/rights associated with roles. It is to be appreciated that various API's can be utilized with the subject invention and the following example is not exhaustive. The API 414 can provide functionality such as, but not limited to, adding and/or removing a user and/or group from a list of users who can modify a process (e.g., such functionality can be done by the creator of the process). In addition, a list of all users and/or groups that can modify a process can be returned. In another example, the API 414 can add and/or remove a user and/or group from the list of owners of the process. Moreover, the API 414 can return a list of all users and/or groups who are owners of the process, wherein the process creator is part of such list. The following pseudo code can be employed in order to achieve the above functionality of the API 414.

public class SecurityManager: System.Web.Services.Service

```
{
    [SoapMethod]
    void AddOrRemoveProcessModifiers(string processName, string userOrGroup, bool addOrRemove /*true means add*/);
    [SoapMethod]
    string[] GetProcessModifiers(string processName);
    [SoapMethod]
    void AddOrRemoveProcessCoOwner(string processName, string userOrGroup, bool addOrRemove /*true means add*/);
    [SoapMethod]
    string[] GetProcessOwners(string processName);
}
```

The security component 402 can further include a notification component 416 that can notify an administrator of acts, potential acts, and/or other suspicious activity in relation to a security breach. The notification component 416 can utilize such data with the threat component 412 to protect against various security breaches. In other words, the notification component 416 can dynamically detect and/or protect against a malicious attack on the system 400. Moreover, the notification component 416 can inform (e.g., email, voicemail, text, Internet, web, . . . ) an administrator of attempted violation of assigned rights associated with a pre-defined role. Thus, a user within a group authorized to manipulate a first process can be reported to an administrator if such user attempts to violate permissions related to processes other than the first process.

The security component 402 can further include a data store 418 that can store various data related to the system 400. The data store 418 can provide storage for various threats determined (e.g., dynamically, manually, . . . ); roles associated with the operating system 408; the role-based authorization model 410, rights and/or attributes assigned to various users, groups, and/or administrators; pseudo code associated with at least one API; etc. The data store 418 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 418 of the subject systems and methods is intended to comprise, without being limited to, these and any other suitable types of memory. In addition, it is to be appreciated that the data store 418 can be a server, a database, and/or a hard drive.

Figure 5:
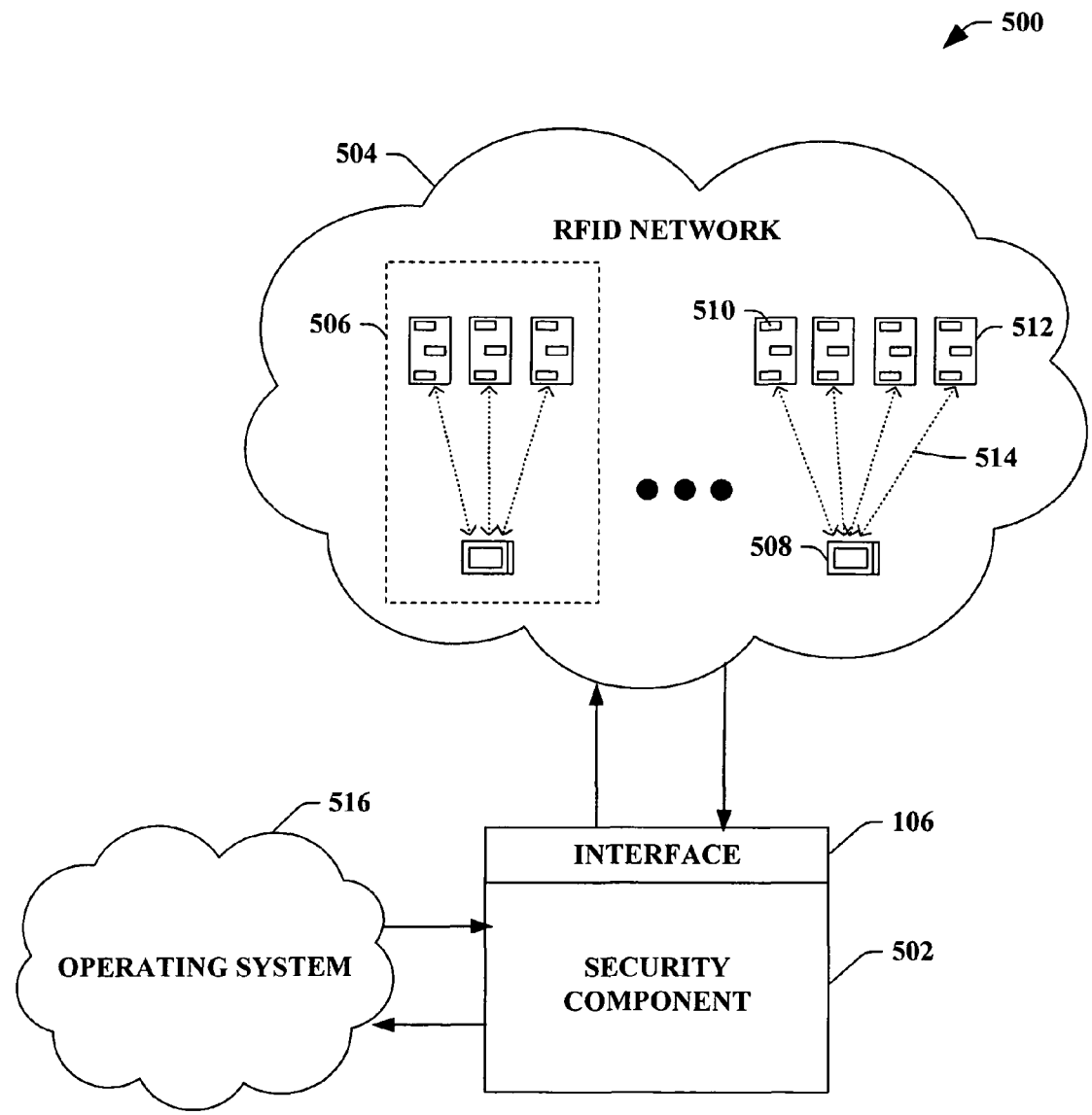
FIG. 5 illustrates a block diagram of an exemplary system that facilitates employing a role-based authorization to an RFID network.

FIG. 5 illustrates a system 500 that facilitates employing a role-based authorization to an RFID network. A security component 502 can provide security and/or authorization to at least one of a manipulation of a process and/or a utilization of a device within such process, wherein both the process and the device are related to the RFID network 504. The security component 502 can incorporate a role-based authorization model within an operating system 516 allowing at least one user and/or group to be employed for a security hierarchy within the RFID network 504. It is to be appreciated that the security component 502, the operating system 516, and the RFID network 504 can be substantially similar to respective components/networks described in previous figures.

The RFID network 504 can include a plurality of universes (e.g., sub-systems, RFID networks), wherein a universe is a server of RFID entities. For simplicity, the RFID network 504 illustrates a single universe containing two collections of devices (e.g., device collections), where a first collection 506 is shown. For instance, an RFID sub-system can be a location wherein the entities involved are related to a substantially similar process. In one example, a sub-system can be a warehouse containing a plurality of receiving and/or shipping dock doors with associated devices. Thus, first collection 506 can be a collection of devices within the specified sub-system. It is to be appreciated a plurality of collection of devices can be implemented. Within a collection of devices, a device 508 can receive an RFID signal 514 from a pallet of goods 512 containing at least one RFID tag 510. It is to be appreciated the pallets and/or goods can be tagged based at least upon user specifications (e.g., single pallets tagged, individual goods tagged, pallets and goods tagged, etc.).

The security component 502 allows security techniques and/or mechanisms associated with the operating system 516 to be incorporated into the RFID network 504, wherein the manipulation of a process and/or the accessibility and/or utilization of the device 508 can be secured. The security component 502 can utilize the role-based authorization model associated with the operating system 516 in conjunction with the rights assigned to an RFID administrator and an RFID user group, wherein users and/or groups related to the operating system 516 can be integrated into the RFID user group.

Figure 6:
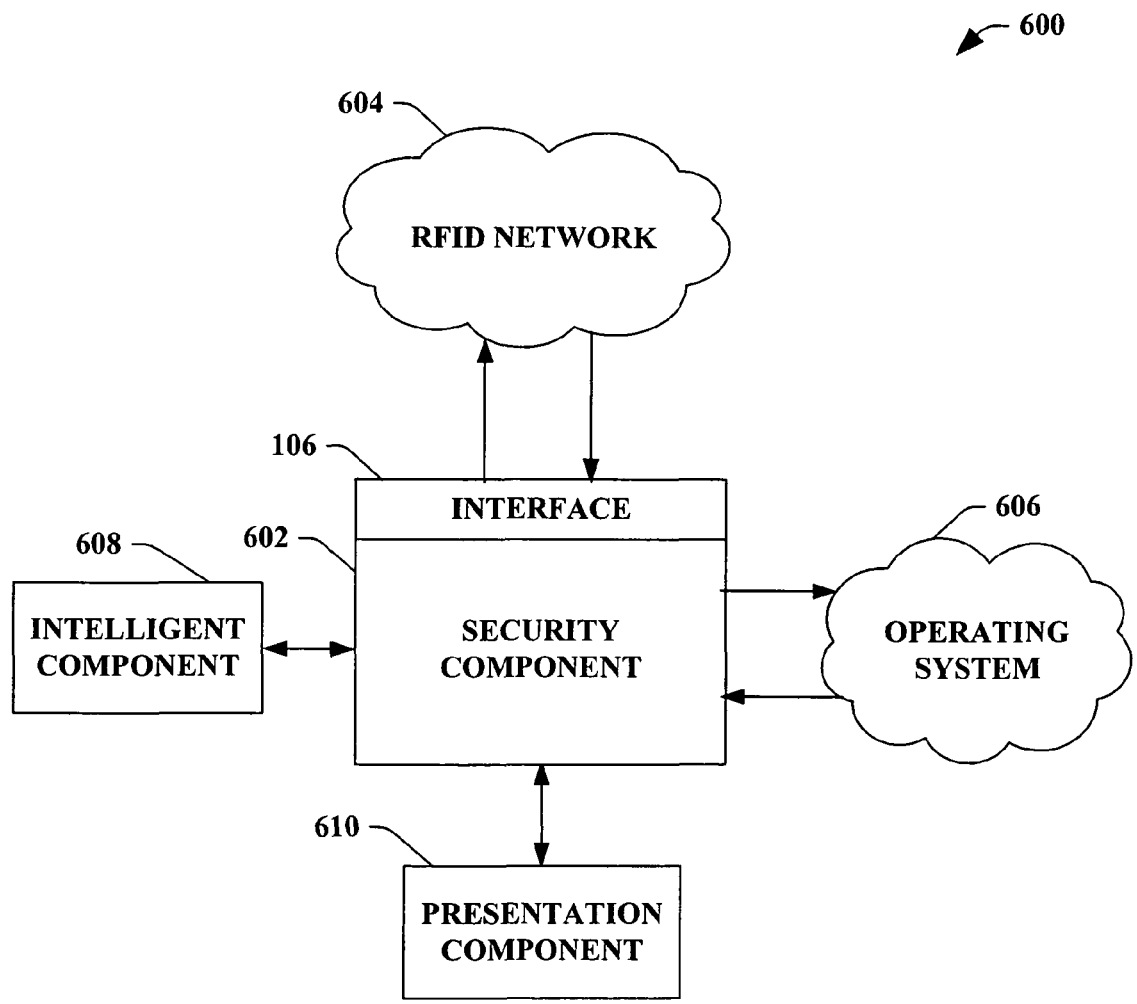
FIG. 6 illustrates a block diagram of an exemplary system that facilitates employing a security technique to an RFID network.

FIG. 6 illustrates a system 600 that employs intelligence to facilitate employing a security technique to an RFID network. The system 600 can include a security component 602, an RFID network 604, an operating system 606, and the interface 106 that can all be substantially similar to respective components/networks described in previous figures. The system 600 further includes an intelligent component 608. The intelligent component 608 can be utilized by the security component 602 to facilitate providing security to the RFID network 604. It is to be appreciated that the enforcement of security can be in a distributed manner (e.g., the security can be enforced across disparate RFID runtimes).

It is to be understood that the intelligent component 608 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the subject invention.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

A presentation component 610 can provide various types of user interfaces to facilitate interaction between a user and any component coupled to the security component 602. As depicted, the presentation component 610 is a separate entity that can be utilized with the security component 602. However, it is to be appreciated that the presentation component 610 and/or similar view components can be incorporated into the security component 602 and/or a stand-alone unit. The presentation component 610 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such vertical and/or horizontal scroll bars for navigation and toolbar buttons to determine whether a region will be viewable can be employed. For example, the user can interact with one or more of the components coupled to the security component 602.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the invention is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 7:
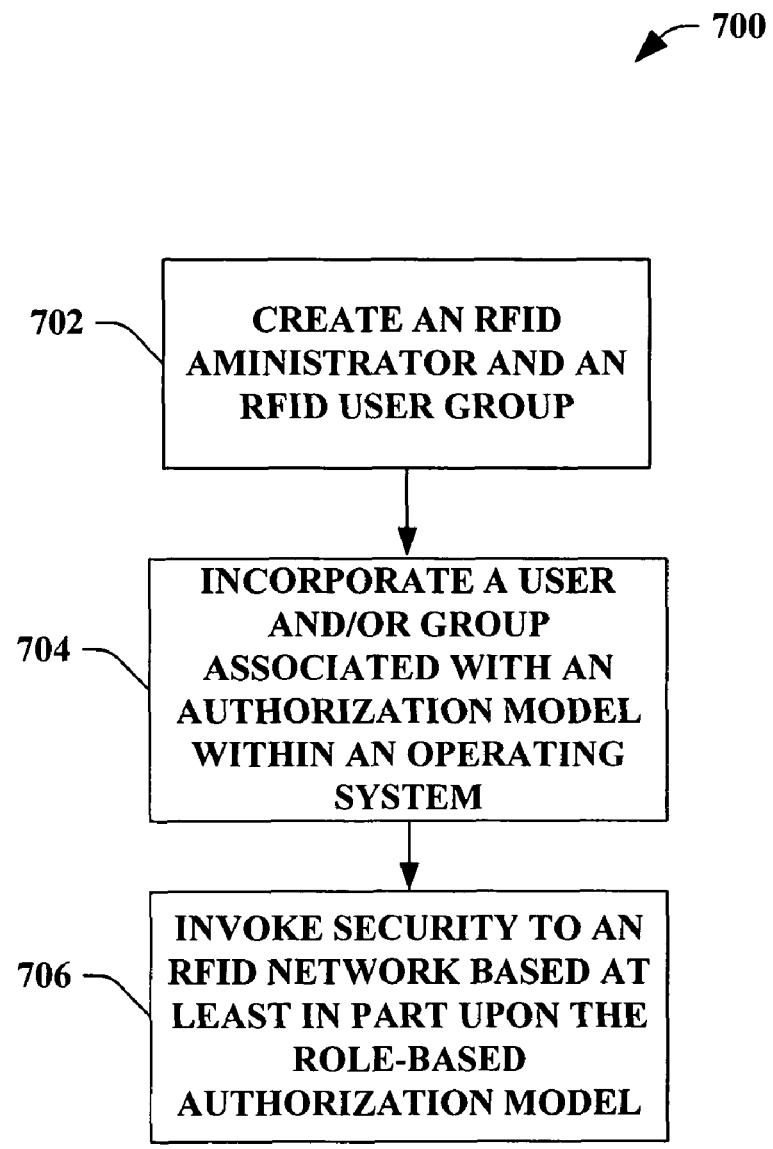
FIG. 7 illustrates an exemplary methodology for invoking a role-based authorization model to an RFID network utilizing an operating system.
Figure 8:
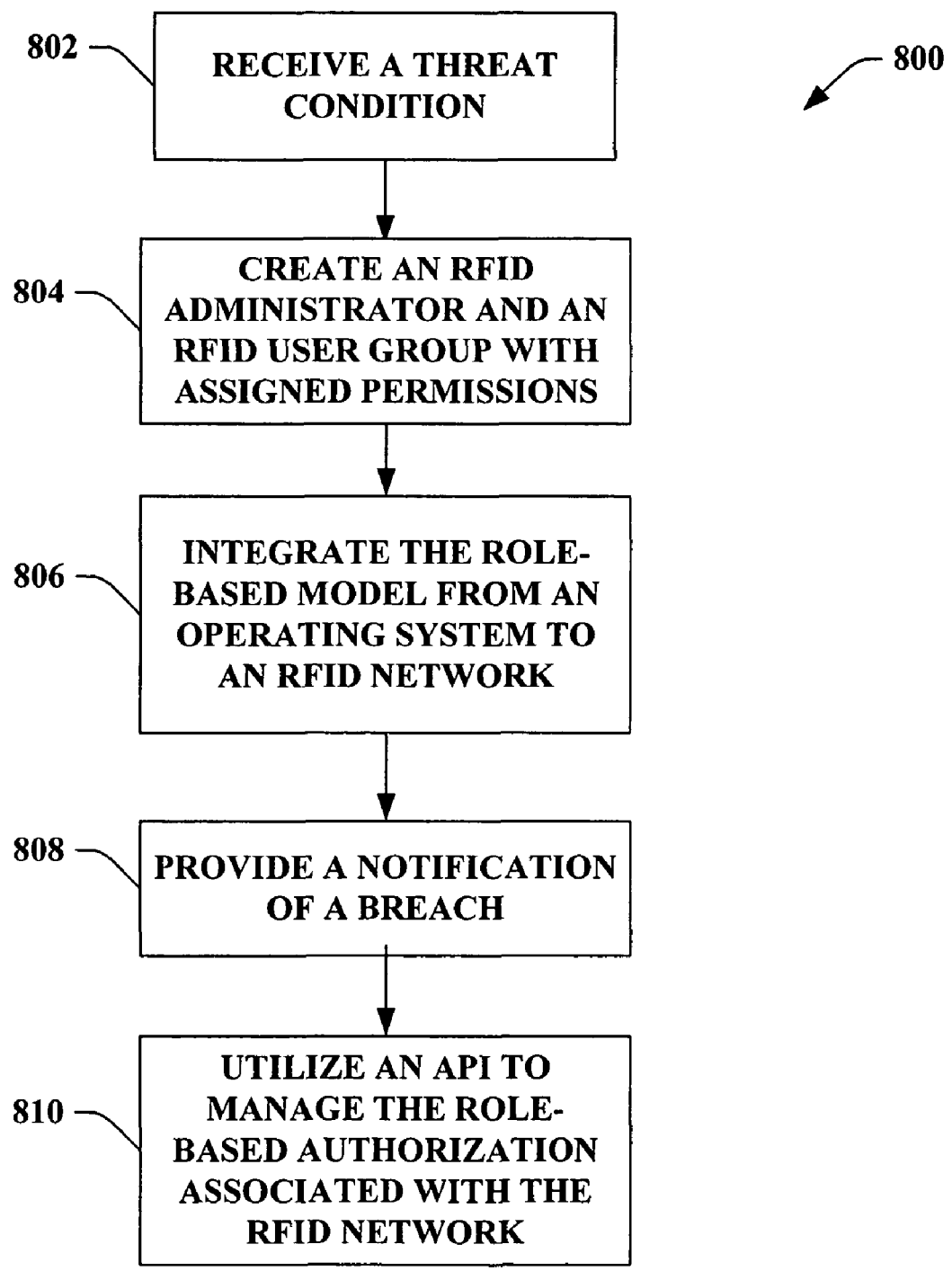
FIG. 8 illustrates an exemplary methodology that facilitates providing at least one security technique to an RFID network in association with an operating system.

FIGS. 7-8 illustrate methodologies in accordance with the subject invention. For simplicity of explanation, the methodologies are depicted and described as a series of acts. It is to be understood and appreciated that the subject invention is not limited by the acts illustrated and/or by the order of acts, for example acts can occur in various orders and/or concurrently, and with other acts not presented and described herein. Furthermore, not all illustrated acts may be required to implement the methodologies in accordance with the subject invention. In addition, those skilled in the art will understand and appreciate that the methodologies could alternatively be represented as a series of interrelated states via a state diagram or events.

FIG. 7 illustrates a methodology 700 for invoking a role-based authorization model to an RFID network utilizing an operating system. At reference numeral 702, an RFID administrator and an RFID user group can be created with assigned rights and/or permissions. The RFID administrator can execute, deploy, create, delete, modify, etc. a process associated with an RFID network. Additionally, the RFID administrator can add, delete, modify rights associated with a user and process permissions. For example, the RFID administrator can add a first user to the RFID user group which has permission to create, modify, and delete a process. Once added to the RFID user group, the user can add and/or remove other users to the process. Furthermore, the RFID administrator can give permissions in relation to accessibility and/or utilization of a device within the RFID network to a process. For instance, if the RFID administrator locks or denies access to a collection of devices, the RFID user group and/or user may not access such devices regardless of permissions related to associated processes.

At reference numeral 704, a user and/or group associated with a role-based authorization model within an operating system can be incorporated with the RFID user group. Thus, any roles, groups, and/or users related to the authorization model within the operating system can be incorporated into the RFID network to provide a substantially similar hierarchy of users related to such operating system. For example, the operating system can include a plurality of users in an organization such as warehouse manager, warehouse employee, DC manager, store employee, etc., wherein such characteristics are the basis of the authorization model. Those roles can be incorporated into the RFID network, and in particular into the RFID administrator and/or RFID user group. At reference numeral 706, security can be provided to the RFID network based at least in part upon the roles and/or role-based authorization model of the operating system. Thus, the use of existing security mechanisms within the operating system platform can be utilized in a specific manner to protect the RFID network from identified threats. The security is provided to at least one of a manipulation (e.g., create, modify, execute, deploy, manage, add user and/or group permission, . . . ) of a process and utilization of a device associated with a process.

FIG. 8 illustrates a methodology 800 that facilitates providing at least one security technique to an RFID network in association with an operating system. At reference numeral 802, a threat condition can be received. The threat condition can be any possible threat and/or vulnerability associated with an RFID network and/or related processes and/or devices. The threat condition can be, but is not limited to, an unauthorized creation of a process within the RFID network, the unauthorized deployment, modification, and/or deletion of a process within the RFID network, a physical attack on a device within the RFID network, an alteration of device configuration, eavesdropping on device-host data exchange, injection of device and/or host data frames, denial of service on device-host data exchange, unauthorized device and/or host, etc. The threat conditions can be manually, automatically, and/or dynamically determined, wherein such conditions can be utilized in conjunction with a track model analysis to protect the RFID network and associated assets.

At reference numeral 804, an RFID administrator and an RFID user group can be created with assigned permissions, attributes, and/or rights. It is to be appreciated that the permissions, attributes, and/or rights can be aimed to protect against various threats known and/or dynamically identified utilizing, for example, the track model analysis. A discussed supra, the RFID administrator can have permission levels above all other users and/or groups, wherein the RFID user group and associated users are subordinate thereto. Moreover, the permissions, attributes, and/or rights can be related to the manipulation of a process within the RFID network and/or accessibility and/or utilization of a device associated with a process within the RFID network. At reference numeral 806, a role-based authorization model within an operating system can be integrated to the RFID network, wherein various characteristics can be incorporated into the RFID administrator and/or RFID user groups. In other words, the existing security mechanisms associated with the operating system, in particular groups and/or users, can be utilized with providing security with the RFID network.

At reference numeral 808, a notification of a breach can be instantiated to, for instance an administrator. The breach can be any malicious attack on the RFID network, internal and/or external, wherein a notification to the proper administrator can be executed. The notification can be, for instance, an email, a text message, a post on a web page, a voicemail, etc. In one instance, the breach can a user with permission to a particular process attempts to access processes outside the scope of such permission. In such a case, a notification and/or log can be utilized to inform and/or track the attempted breach of security. At reference numeral 810, an API can be utilized to manage the role-based authorization associated with the RFID network. For example, an API can be invoked during runtime to allow at least one of the following: 1) the addition/removal of a user and/or group form a list of users who can modify a process; 2) return of a list of all users and/or groups who can modify a process; 3) add and/or remove a user and/or group from the list of owners of the process; and 4) return the list of all users and/or groups who are owners of the process. It is to be appreciated that numerous API's with a plurality of functionality can be employed with the subject invention and the above examples are not to be seen as limiting.

Figure 9:
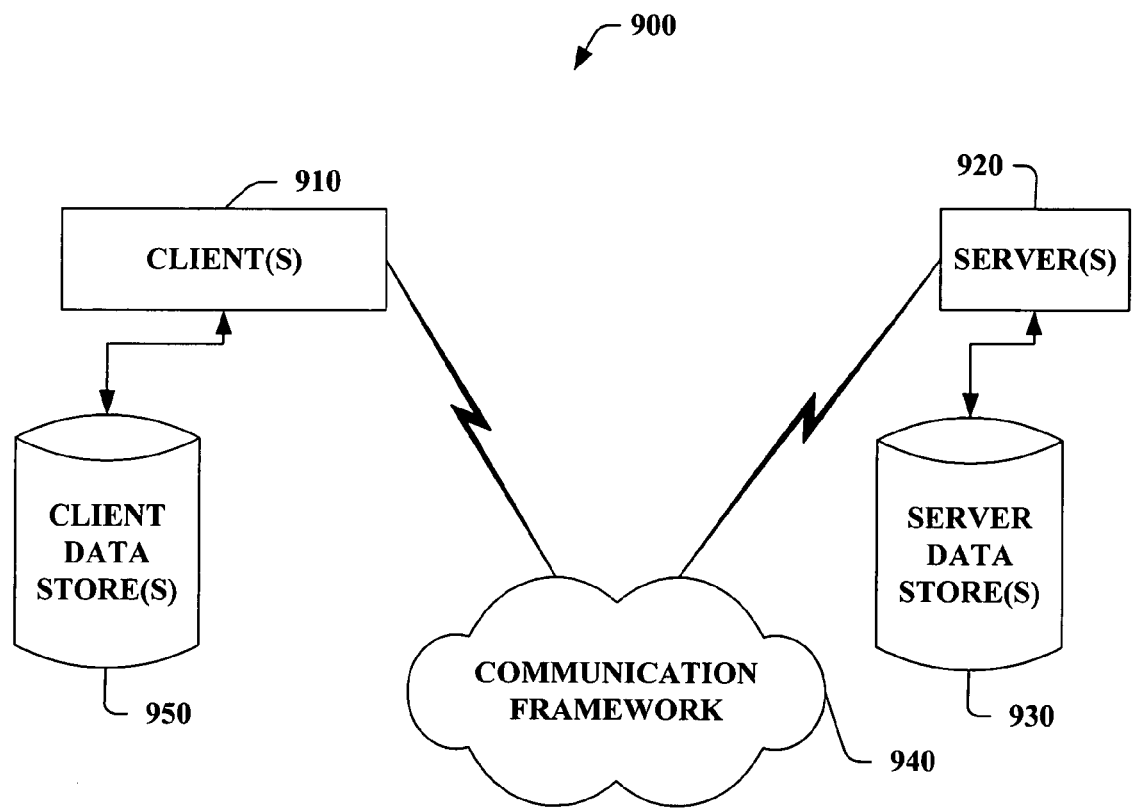
FIG. 9 illustrates an exemplary networking environment, wherein the novel aspects of the subject invention can be employed.
Figure 10:
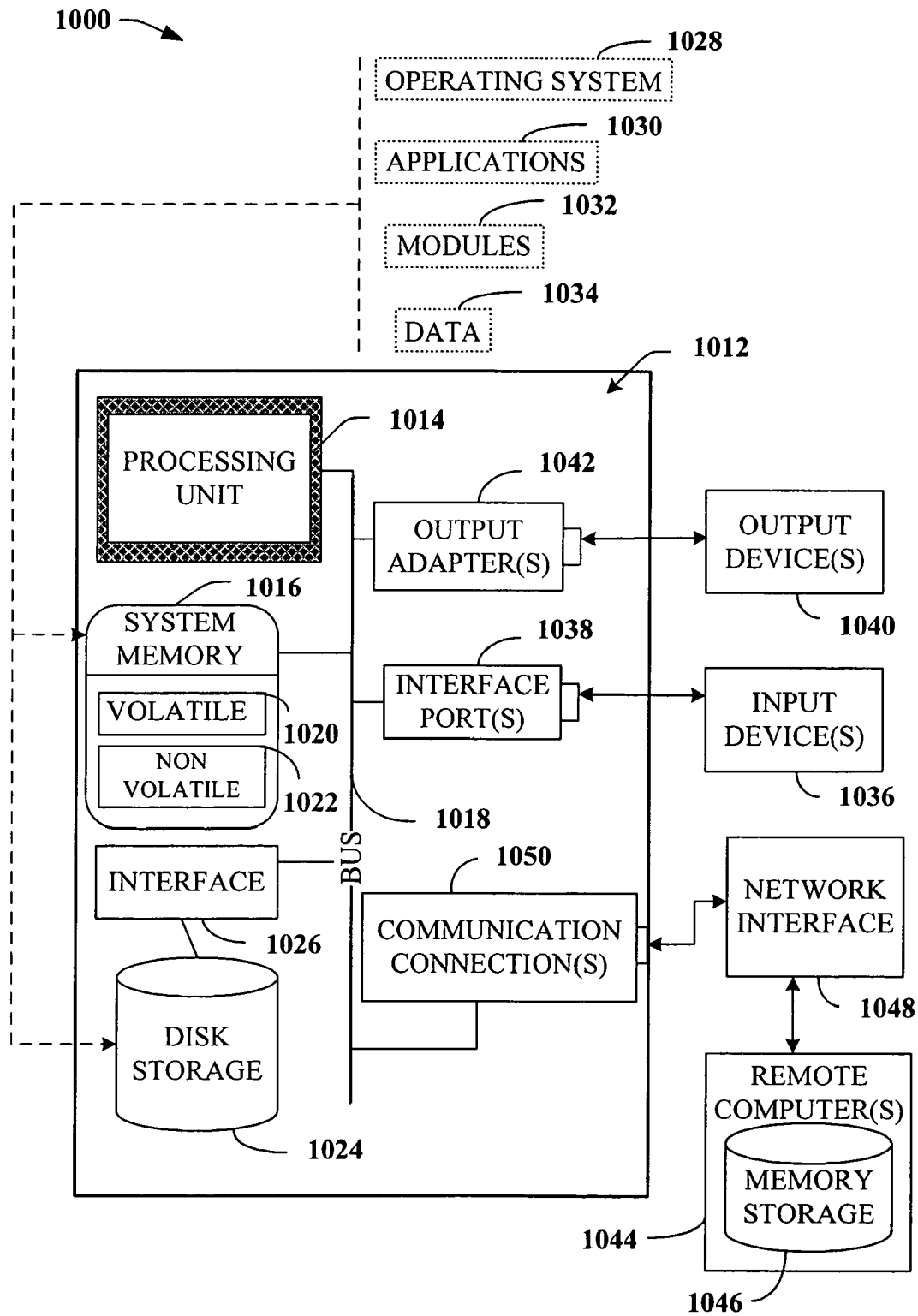
FIG. 10 illustrates an exemplary operating environment that can be employed in accordance with the subject invention.

In order to provide additional context for implementing various aspects of the subject invention, FIGS. 9-10 and the following discussion is intended to provide a brief, general description of a suitable computing environment in which the various aspects of the subject invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

FIG. 9 is a schematic block diagram of a sample-computing environment 900 with which the subject invention can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject invention, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the invention includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the subject invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates employing security to a Radio Frequency Identification (RFID) network, comprising:
    an RFID device that is associated with at least one RFID process;
    a processor that executes the following computer executable components stored on a computer readable medium:
        an interface that receives a role-based authorization model associated with an operating system, wherein the role-based authorization model defines a security hierarchy;
        a security component that applies the role-based authorization model to an RFID network to define security permissions for the RFID network, wherein the security component comprises a first security layer that regulates processing of the RFID process and a second security layer that regulates use of the RFID device such that the RFID process and the RFID device are protected from threats and breaches, wherein the security component is configured to analyze possible threats and/or breaches to the security of the RFID network that could be introduced via the RFID process or the RFID device, wherein the possible threats and/or breaches relate to at least one of manipulation of the at least one associated RFID process and the utilization of the RFID device within the RFID network, the possible threats and/or breaches being determined before any actual threat or breach has occurred; and
        a threat component that utilizes a track model analysis to dynamically determine RFID network vulnerabilities and threat conditions that the security component is configured to prevent, wherein the threat conditions are determined before the occurrence of an actual intrusion, and wherein the track model analysis provides a list of one or more vulnerabilities including the resources, entry points, trust levels, data flow diagrams, and determined ways of compromising the RFID network.

2. The system of claim 1, the RFID network includes at least one of an RFID reader; an RFID writer; an RFID printer; a printer; a reader; a writer; an RFID transmitter; an antenna; a sensor; a real time device; an RFID receiver; a real time sensor; a device extensible to a web service; or a real time event generation system.

3. The system of claim 1, the RFID network includes at least one of an outbound process; a manufacturing process; a shipping process; a receiving process; a tracking process; a data representation process; a data manipulation process; a security process; or a process utilizing one of an RFID device service, a device collection, a tag read, an event, an event queue, a tag write, a device configuration, or a number count.

4. The system of claim 1, the RFID network comprises a collection of devices that form a sub-system, which includes:
an RFID reader that receives an RFID signal; and
an RFID tag that transmits the RFID signal.

5. The system of claim 1, further comprising a role component that creates an RFID administrator and an RFID user group with respective permissions corresponding to permissions from the role-based authorization model.

6. The system of claim 5, the RFID administrator manipulates a process within the RFID network.

7. The system of claim 6, the manipulation of the process is at least one of an execution; a modification; a creation; a deletion; a deployment; or a termination.

8. The system of claim 5, the RFID administrator incorporates at least one of a user or a group from the role-based authorization model into the RFID user group to utilize the security hierarchy.

9. The system of claim 8, the RFID administrator dictates permission to at least one of the user or the group to manipulate a process within the RFID network, wherein the manipulation is at least one of a creation of the process, a modification of the process, or a deletion of the process.

10. The system of claim 9, at least one of the user or the group dictates permission to at least one of a disparate user or a disparate group to manipulate a process within the RFID network, wherein the manipulation is at least one of a creation of the process, a modification of the process, or a deletion of the process.

11. The system of claim 8, the RFID administrator dictates permission associated with a device within the RFID network to at least one of the user or the group.

12. The system of claim 1, further comprising a threat component that utilizes a track model analysis to determine a threat condition that the security component prevents.

13. The system of claim 1, further comprising at least one of an analyzer component that determines a characteristic of the role-based authorization model within the operating system to incorporate with the RFID network; or a manager component that manages at least one of a role or a permission associated with the RFID network.

14. The system of claim 1, further comprising at least one of an application programming interface (API) component that invokes an API to modify permissions associated with at least one of an RFID administrator or an RFID user group; or a notification component that alerts an administrator of at least one of a security breach or an attempted security breach, wherein the security breach is at least one of internal or external.

15. A method that facilitates employing security to a Radio Frequency Identification RFID network, comprising:
employing a processor to execute computer readable instructions stored in a computer readable medium to perform the following acts:
creating an RFID administrator and an RFID user group;
incorporating existing roles associated with an authorization model within an operating system into the RFID user group;
invoking a security component in the RFID network based upon the authorization model, wherein the security component comprises a first security layer that regulates processing of the RFID process and a second security layer that regulates use of the RFID device such that the RFID process and the RFID device are protected from threats and breaches, wherein the security component is configured to analyze possible threats and/or breaches to the security of the RFID network that could be introduced via the RFID process or the RFID device, wherein the possible threats and/or breaches relate to at least one of manipulation of the at least one associated RFID process and the utilization of the RFID device within the RFID network, the possible threats and/or breaches being determined before any actual threat or breach has occurred; and
invoking a threat component that utilizes a track model analysis to dynamically determine RFID network vulnerabilities and threat conditions that the security component is configured to prevent, wherein the threat conditions are determined before the occurrence of an actual intrusion, and wherein the track model analysis provides a list of one or more vulnerabilities including the resources, entry points, trust levels, data flow diagrams, and determined ways of compromising the RFID network.

16. The method of claim 15, further comprising:
receiving a threat condition;
utilizing a track model analysis to determine a threat condition to protect against;
assigning at least one permission to at least one of the RFID administrator or the RFID user group;
providing a notification of a breach; and
utilizing an API to manage the security of the RFID network.

17. A computer-implemented system that facilitates employing security to a Radio Frequency Identification (RFID) network, comprising:
an RFID device that is associated with at least one RFID process;
means for receiving a hierarchy of security related to an operating system;
means for incorporating the hierarchy of security into an RFID network, wherein a security component comprises a first security layer that regulates processing of the RFID process and a second security layer that regulates use of the RFID device such that the RFID process and the RFID device are protected from threats and breaches, wherein the security component is configured to analyze possible threats and/or breaches to the security of the RFID network that could be introduced via the RFID process or the RFID device, wherein the possible threats and/or breaches relate to at least one of manipulation of the at least one associated RFID process and the utilization of the RFID device within the RFID network, the possible threats and/or breaches being determined before any actual threat or breach has occurred; and
means for utilizing a track model analysis to dynamically determine RFID network vulnerabilities and threat conditions that the security component is configured to prevent, wherein the threat conditions are determined before the occurrence of an actual intrusion, and wherein the track model analysis provides a list of one or more vulnerabilities including the resources, entry points, trust levels, data flow diagrams, and determined ways of compromising the RFID network.

18. The system of claim 12, the track model analysis provides a security model that exposes vulnerabilities of the RFID network.

19. The method of claim 16, wherein the track model analysis dynamically identifies the threat condition.

20. The system of claim 5, wherein the RFID user group comprises both structured query language (SQL) users and SQL roles.

* * * * *